United States Patent
Hillmer et al.

(10) Patent No.: US 9,926,222 B2
(45) Date of Patent: Mar. 27, 2018

(54) INSULATION MATERIAL AND A METHOD TO PRODUCE

(71) Applicant: ALSTOM TECHNOLOGY LTD, Baden (CH)

(72) Inventors: Thomas Hillmer, Suhr (CH); Paul Howard, Stafford (GB); Iwona Szkoda-Giannaki, Stafford (GB); Thomas Baumann, Wettingen (CH)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/127,228

(22) PCT Filed: Mar. 10, 2015

(86) PCT No.: PCT/EP2015/054957
§ 371 (c)(1),
(2) Date: Sep. 19, 2016

(87) PCT Pub. No.: WO2015/140007
PCT Pub. Date: Sep. 24, 2015

(65) Prior Publication Data
US 2017/0101337 A1    Apr. 13, 2017

(30) Foreign Application Priority Data

Mar. 20, 2014    (EP) .................... 14160846

(51) Int. Cl.
*C09K 5/14* (2006.01)
*C03C 10/00* (2006.01)
(Continued)

(52) U.S. Cl.
CPC .......... *C03C 10/0009* (2013.01); *C03B 32/02* (2013.01); *C03B 37/005* (2013.01);
(Continued)

(58) Field of Classification Search
CPC .............. C03C 14/004; C03C 2214/04; C03C 10/0009; C03C 10/00
See application file for complete search history.

(56) References Cited

U.S. PATENT DOCUMENTS 3,873,329 A * 3/1975 Beall ....................... C03B 32/02
501/4
3,973,972 A * 8/1976 Muller ................ C03C 10/0027
106/35

(Continued)

FOREIGN PATENT DOCUMENTS

DE        1496488 A1    8/1969
FR        1317042 A     2/1963
WO     2008087093 A1    7/2008

OTHER PUBLICATIONS

Donald I W et al: "The Preparation and Properties of Some Lithium Zinc Silicate Glass-Ceramics" Journal of Materials Science. Kluwer Academic Publishers. Dordrecht. vol. 24. No. 11. Nov. 1, 1989 (Nov. 1, 1989). pp. 3892-3903. XP000100840. ISSN: 0022-2461. DOI: 10.1007/BF01168952 abstract 1. Introduction; 2. Experimental procedures pp. 1I-II.

(Continued)

*Primary Examiner* — Noah S Wiese
(74) *Attorney, Agent, or Firm* — GE Global Patent Operation; Rita D. Vacca

(57) ABSTRACT

The present disclosure relates to an insulation material for a conductor bar of an electric machine. An object of the invention is to provide for an alternative insulation material in the field of electric machines. The object is solved by an insulation material for a conductor bar for an electric machine comprising glass-ceramic flakes made from a heat treated silica glass precursor in the shape of flakes. Further (Continued)

disclosed are a corresponding method and the use of glass-ceramic flakes as an insulation material for a conductor bar of an electric machine.

12 Claims, 2 Drawing Sheets

(51) Int. Cl.
    *C03C 4/16*     (2006.01)
    *C03B 32/02*     (2006.01)
    *C03B 37/005*     (2006.01)
    *H01B 3/08*     (2006.01)
    *H01B 3/00*     (2006.01)
    *H02K 3/30*     (2006.01)

(52) U.S. Cl.
    CPC ............... *C03C 4/16* (2013.01); *C09K 5/14* (2013.01); *H01B 3/002* (2013.01); *H01B 3/08* (2013.01); *H02K 3/30* (2013.01); *C03C 2204/00* (2013.01)

(56) References Cited

U.S. PATENT DOCUMENTS

| | | | |
|---|---|---|---|
| 5,017,207 A | 5/1991 | Watkinson | |
| 5,643,649 A * | 7/1997 | Hagan | C03B 25/02 428/426 |
| 8,568,526 B2 * | 10/2013 | Rueger | C03B 37/005 106/482 |
| 2004/0085177 A1 | 5/2004 | Razzell | |
| 2004/0152034 A1 * | 8/2004 | Cummings | A61K 6/0276 433/8 |
| 2006/0048679 A1 * | 3/2006 | Fujiwara | C03B 37/005 106/482 |
| 2011/0177397 A1 | 7/2011 | Ogasa | |

OTHER PUBLICATIONS

Goswami et al: "MAS-NMR study of lithium zinc silicate glasses and glass-ceramics with various ZnO content" Journal of Solid State Chemistry. Orlando. FL US. vol. 181. No. 2. Jan. 4, 2008 (Jan. 4, 2008). pp. 269-275. XP022451254. ISSN: 0022-4596. DOI: 10.1016/J.JSSC.2007.11.023 abstract 1. Introduction; 2. Experimental.

International Search Report and Written Opinion issued in connection with corresponding PCT application PCT/EP2015/054957 dated Apr. 22, 2015.

European Search Report issued in connection with corresponding EP application PCT/EP2015/054957 dated May 21, 2014.

* cited by examiner

INSULATION MATERIAL AND A METHOD TO PRODUCE

TECHNICAL FIELD

The present disclosure relates to an insulation material, a method to manufacture an insulation material for an electric machine, a use of polycrystalline flakes from at least one silicate glass, and the use of an insulation material as a conductor bar in an electric machine.

The electric machine is, in particular, a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

BACKGROUND

In electric machines, commonly electrically conductive bars are used for the stator or the rotor. The conductive bars are accommodated in notches usually milled into the stator or rotor body. The conductor bars, sometimes having a drilled arrangement of the leads and then referred to as Roebel bars are insulated for high voltages when used in the technical field of generators. The insulation layers at the conductor bars often are composed of three components of which mica is the main component. Mica has a relatively low thermal conductivity of approximately 0.5 W/mK in the axial (normal-to-plane) direction, thus limiting the heat transfer within the entire insulation composite. The mica also governs the coefficient of thermal expansion (CTE) of the insulation in the in-plane direction, forcing it to a CTE of approximately $10 \times 10^{-6}$ $K^{-1}$, which is substantially lower than the CTE of the copper conductor. Hence, there is a need for an alternative electrical insulation material that has higher thermal conductivity and CTE.

EP2102968A1 describes a conductor bar for the stator of a generator which includes multiple internally positioned partial conductors which are surrounded externally by an insulation layer including impregnated glass/mica bands wound around the partial conductors. To improve the mechanical adhesion between the partial conductors and the insulation layer, at least one intermediate layer is provided between the insulation layer and the partial conductors.

An aspect of embodiments of the present invention is to provide an alternative insulation material in the field of electric machines.

BRIEF DESCRIPTION

An aspect of the disclosure includes an insulation material for an electric machine including a polycrystalline glass-ceramic material as a main component.

Another aspect of the disclosure provides a method to produce an insulation material including the step of heat treating a silicate glass to obtain a glass-ceramic material.

A further aspect of the present disclosure is the use of an insulation material for a conductor bar in an electric machine.

Further examples of the invention are described herein.

BRIEF DESCRIPTION OF THE DRAWINGS

Further characteristics and advantages will be more apparent from the description of a preferred but non-exclusive embodiment of the insulation material and the use thereof, illustrated by way of a non-limiting example in the accompanying drawings, in which.

DETAILED DESCRIPTION

Figure 1:
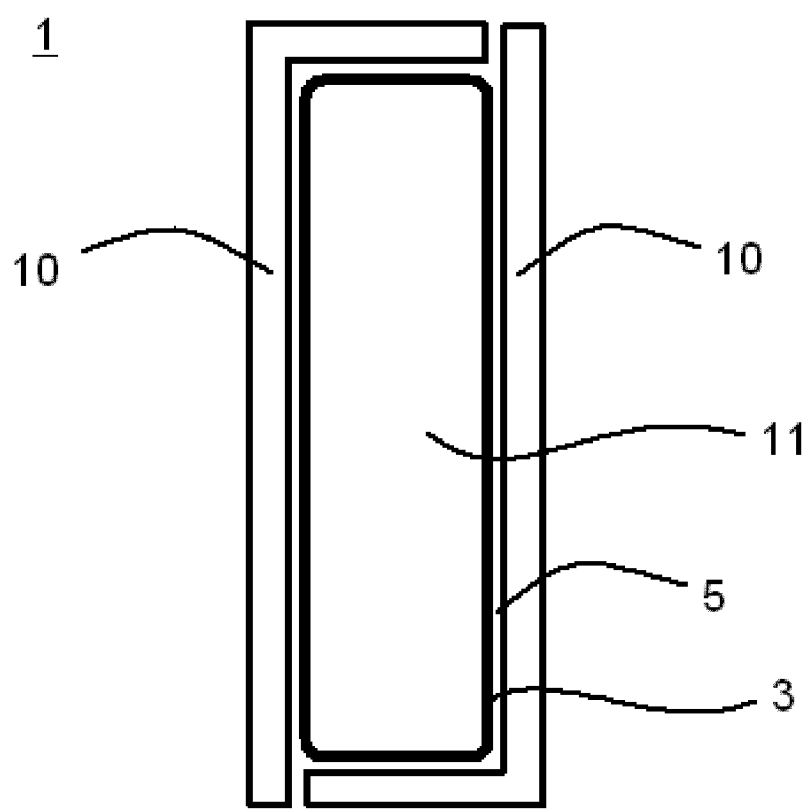
FIG. 1 is a schematic view of the cross-section of a conductor bar with an insulation material according to an embodiment.
Figure 2:
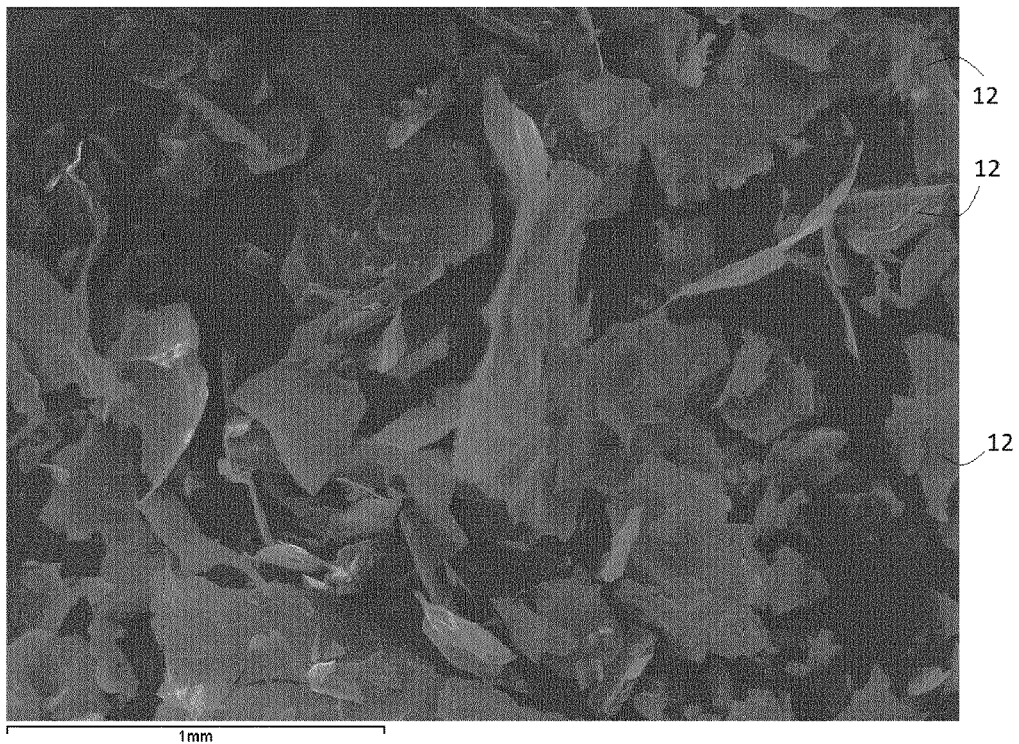
Figure 3:
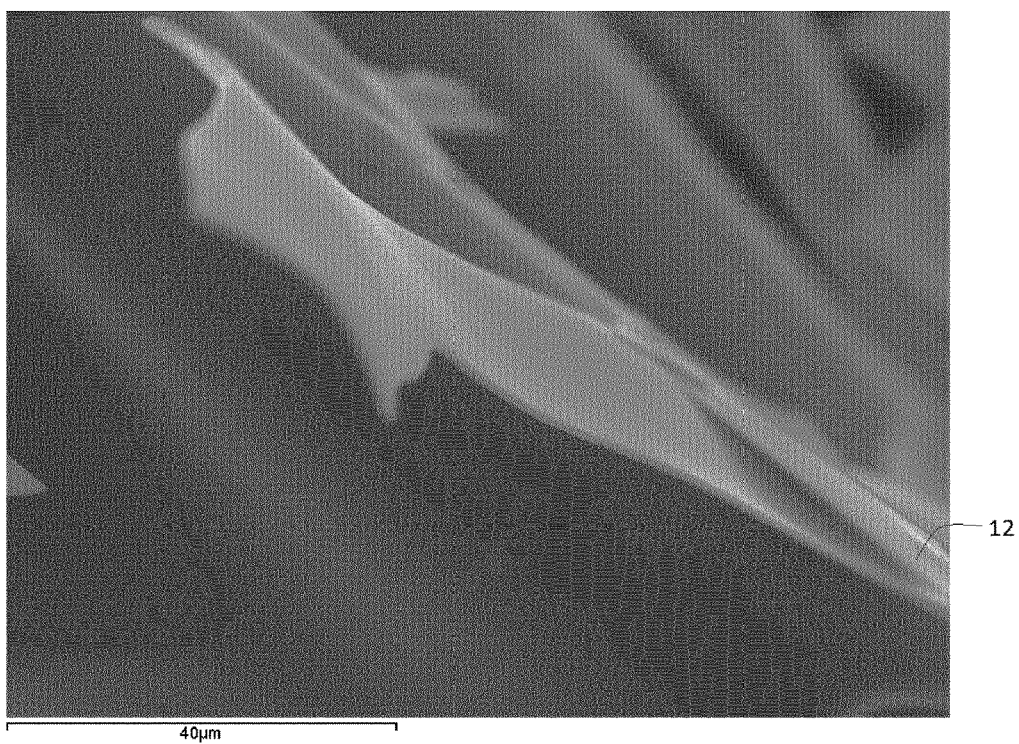

FIG. 1 shows a schematic cross-section of a conductor bar 1 with an insulation material 3 according to an embodiment of the invention. Inside, a conductive bar 11 is arranged, which is covered by an insulation layer made of insulation material 3, also referred to as main wall insulation. The common insulation according to the state of the art includes a mica material impregnated with a resin different to the material 3 used according to an embodiment. The conductive bar 11 consists of the actual half-winding out of copper-strands where the voltage is induced and the electrical current is flowing during the operation of a generator in which the conductor bar 1 is assembled. Optionally, around the insulation layer 3 a release tape 5 is arranged which serves for unpacking the conductor bar 1 after curing of a resin without damaging the insulation material 3. Further, around the release tape 5 two shapes 10 or accommodating tools are arranged essentially enclosing the three former items. The shapes 10 are for creating defined dimensions and smooth surfaces of the straight sections of the insulated conductive bar 11. The shapes 10 are made of steel and have the form of an 'L' with one long side and a shorter side at the end perpendicular to the long side. The shapes 10 are arranged in a way to create a closed loop around the oval arrangement and are to be removed after manufacture of the conductor bar 1.

Described herein by way of an example is the production of a glass-ceramic as an alternative to mica material based upon two material production processes. The first of these is the production of silicate glasses having a composition in the form of thin amorphous flakes. The second process is to transform the silicate glass flakes into a polycrystalline form by a heat treatment. The product of these two processes is a glass-ceramic flake. Thus, in this example, glasses of particular compositions are produced first as amorphous glass flakes and then heat treated to produce polycrystalline glass-ceramic flakes. The definition of the particular compositions of the silicate glasses is described in the following.

As a first process, two silicate glasses are described by example in the following. The first embodiment of a composition of a silicate glass is composed of silica, lithium oxide, zinc oxide and phosphorus pentoxide. The latter materials are also referred to as glass precursors. In one embodiment, the compositional ranges are silica 50-65 wt. %, lithium oxide 8-16 wt. %, zinc oxide 22-32 wt. %, and phosphorous pentoxide 1.5-3.5 wt. %. In another embodiment, the compositional ranges are silica 73-85 wt. %, lithium oxide 8-15 wt. %, zinc oxide 2-7 wt. %, phosphorous pentoxide 1-3 wt. %, and potassium oxide 1.5-3.5 wt. %. This silicate glass is melted in air at 1300° C. then processed to produce amorphous glass flakes. When heat treated, these silicate glass flakes are transformed into lithium-zinc-silicate-type glass-ceramic flakes. The second embodiment of a glass is composed of silica, lithium oxide, zinc oxide, potassium oxide and phosphorus pentoxide. This glass is melted in air at 1400° C. then processed to produce amorphous glass flakes. When heat treated, these glass flakes are transformed into lithium disilicate-type glass-ceramic flakes.

In an embodiment, a glass-ceramic flake includes 80% crystallinity, another embodiment includes 40% crystallinity, and a further embodiment includes 44% crystallinity. Certain properties of the glass-ceramics have been measured as follows. The average coefficient of thermal expansion of one glass-ceramic between room temperature and 200° C. is measured to be $11.4 \times 10^{-6}$ $K^{-1}$ and the dielectric strength is in the range of 30-42 kV/mm. The average coefficient of thermal expansion of another glass-ceramic between room temperature and 200° C. is measured to be $16.5 \times 10^{-6} K^{-1}$. The thermal conductivity is 2.6 W/mK and the dielectric strength is in the range of 20-32 kV/mm.

The resulting glass-ceramic material that forms the main component of insulation material 3 has a complex microstructure consisting mainly of micron-scale crystallites with a small proportion of residual amorphous glass. Being predominantly polycrystalline, the glass-ceramic flake has an isotropic thermal conductivity of approximately 3 W/mK. This is six times greater than the thermal conductivity of mica in its axial direction.

After transformation of the glasses by heat treatment, the obtained glass-ceramics contains various crystalline phases that have been identified as lithium zinc silicate, lithium metasilicate, lithium disilicate, quartz, crystobalite and tridymite.

The present disclosure also relates to the use of the polycrystalline glass-ceramic material as the main component of an insulation material 3 for a conductor bar 1 in an electric machine. In this application the commonly used mica material as insulation for a conductor bar, for example a Roebel bar, is replaced by the material disclosed.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. An insulation material for an electric machine comprising:
a polycrystalline glass-ceramic flake material comprising an inorganic component having around 40% to 80% crystallinity with a thermal conductivity greater than about 0.5 W/mK, or a coefficient of thermal expansion greater than about $11 \times 10^{-6}$ $K^{-1}$ between about 25 and 200° C., effective for insulating a conductor bar in an electric machine.

2. The insulation material according to claim 1, wherein the polycrystalline glass-ceramic flake material comprises a proportion of residual amorphous glass.

3. The insulation material according to claim 2, wherein the polycrystalline glass-ceramic flake material comprises a crystal phase lithium zinc silicate, lithium metasilicate, lithium disilicate, quartz, cristobalite, or tridymite.

4. The insulation material according to claim 3, wherein the polycrystalline glass-ceramic flake material is produced from a glass precursor comprising silica, lithium oxide, zinc oxide, and phosphorous pentoxide melted in air at about 1300° C.

5. The insulation material according to claim 3, wherein the polycrystalline glass-ceramic flake material is produced from a first glass precursor comprising silica, lithium oxide, zinc oxide, and phosphorous pentoxide and a second glass precursor comprising silica, lithium oxide, zinc oxide, potassium oxide, and phosphorous pentoxide melted in air at about 1400° C.

6. The insulation material according to claim 1, wherein the inorganic component has around 80% crystallinity.

7. The insulation material according to claim 1, wherein the inorganic component has around 40% crystallinity.

8. The insulation material according to claim 1, wherein the inorganic component has around 44% crystallinity.

9. A material comprising:
polycrystalline glass-ceramic flakes comprising an inorganic component having around 40% to 80% crystallinity with a thermal conductivity greater than about 0.5 W/mK, or a coefficient of thermal expansion greater than about $11 \times 10^{-6}$ $K^{-1}$ between about 25 and 200° C., produced by heat treating amorphous flakes to a temperature effective for polycrystalline structure formation; and
the amorphous flakes comprise a first silicate glass composed of silica, lithium oxide, zinc oxide and phosphorus pentoxide and a second silicate glass composed of silica, lithium oxide, zinc oxide, potassium oxide and phosphorus pentoxide.

10. A method to produce an insulation material comprising:
heat treating a silicate glass flake comprising amorphous flakes obtained by heating a first silicate glass and a second silicate glass, to obtain a glass-ceramic flake material;
wherein the first silicate glass is composed of silica, lithium oxide, zinc oxide and phosphorus pentoxide, and the second silicate glass is composed of silica, lithium oxide, zinc oxide, potassium oxide and phosphorus pentoxide.

11. The method of claim 10, wherein the obtained glass-ceramic flake material is polycrystalline.

12. The method of claim 10, wherein at least one of the heating of the first silicate glass and the second silicate glass, or the heat treating of the silicate glass flake results in a residual amorphous glass, wherein the insulation material comprises a proportion of the residual amorphous glass.

* * * * *